United States Patent [19]

Stevens

[11] 4,074,581
[45] Feb. 21, 1978

[54] COMPACT TRANSMISSION HAVING A POWER TAKEOFF SHAFT AND HYDRAULICALLY ACTUATED CLUTCHES

[75] Inventor: W. Gene Stevens, Dunlap, Ill.

[73] Assignee: Caterpillar Tractor Co., Peoria, Ill.

[21] Appl. No.: 685,475

[22] Filed: May 11, 1976

[51] Int. Cl.² ..................... F16H 3/08; F16H 37/00
[52] U.S. Cl. ............................. 74/15.66; 74/740;
74/759; 74/760
[58] Field of Search ............... 74/740, 15.66, 331,
74/333, 329, 325, 342, 359, 360

[56] References Cited

U.S. PATENT DOCUMENTS

| | | | |
|---|---|---|---|
| 1,513,822 | 11/1924 | Josephs, Jr. et al. | 74/342 |
| 2,323,384 | 7/1943 | Eberhard | 74/15.66 X |
| 2,838,940 | 6/1958 | Swenson et al. | 74/740 X |
| 2,947,190 | 8/1960 | Johnson | 74/331 X |
| 3,774,460 | 11/1973 | Browning et al. | 74/740 X |
| 3,837,237 | 9/1974 | Rossler et al. | 74/740 |
| 3,897,699 | 8/1975 | Hoyer | 74/360 X |

FOREIGN PATENT DOCUMENTS

| | | | |
|---|---|---|---|
| 537,542 | 2/1957 | Canada | 74/740 |
| 717,450 | 10/1954 | United Kingdom | 74/359 |

Primary Examiner—Samuel Scott
Assistant Examiner—Carl F. Pietruszka
Attorney, Agent, or Firm—Phillips, Moore, Weissenberger, Lempio & Majestic

[57] ABSTRACT

A vehicle transmission couples a planetary type reduction section and a multi range speed section by means of a directional drive section. The planetary reduction section provides two underway speed ranges for each speed and direction combination selected in the multi range speed section and directional drive section. The two speed ranges available in the planetary reduction section are obtained through a rotating clutch selectively operable to engage the planet carrier with the input shaft to drive an output sun gear interconnected with the directional drive section, and a brake to stop rotation of the planet carrier relative the input shaft to allow the output sun gear to be driven by planet gears mounted on the planet carrier. Coaxial arrangement of the directional drive section about the input shaft permits direct drive of a power takeoff coupling mounted on the input shaft and further allows mounting of an accessory drive gear on the input shaft.

8 Claims, 5 Drawing Figures

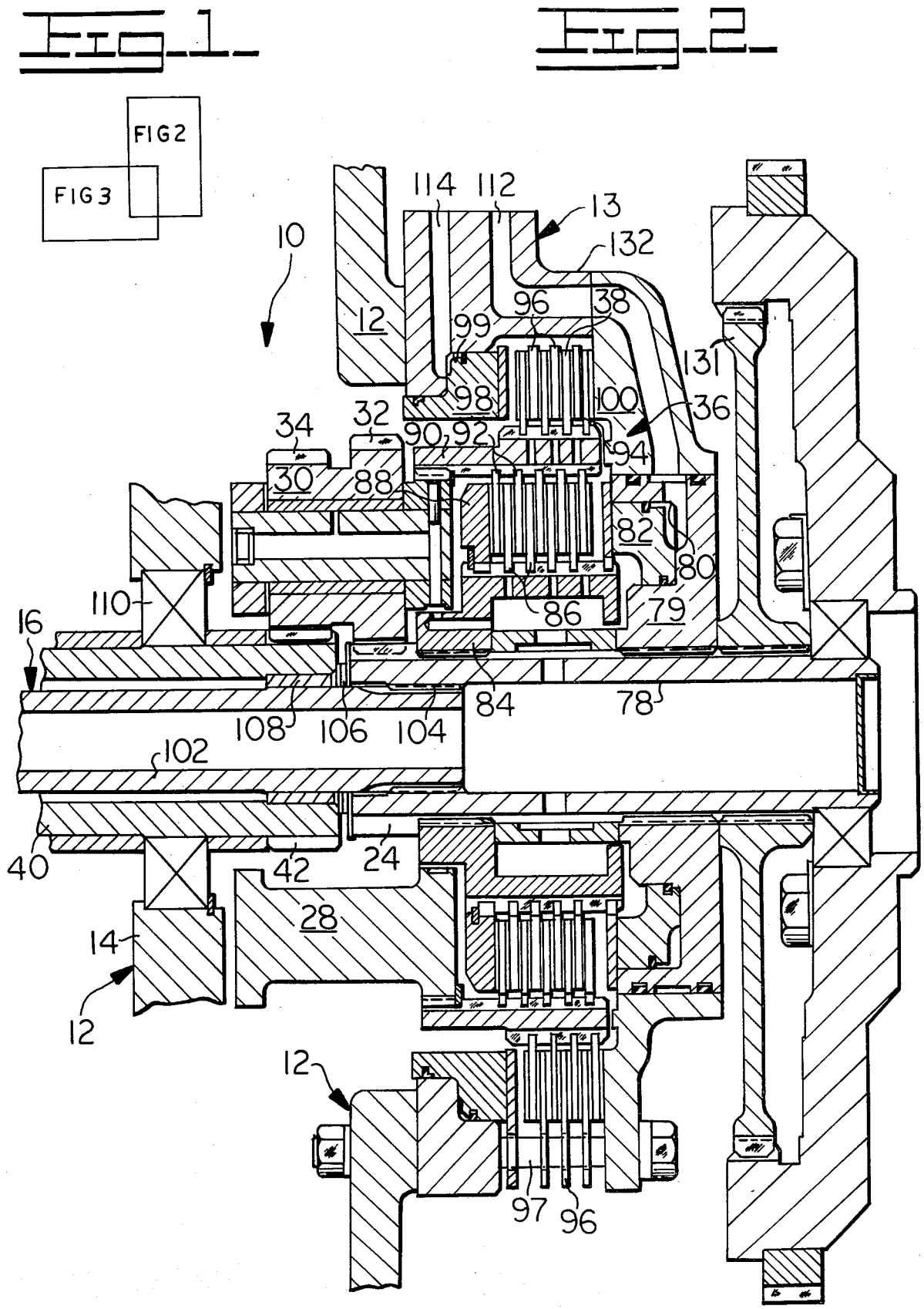

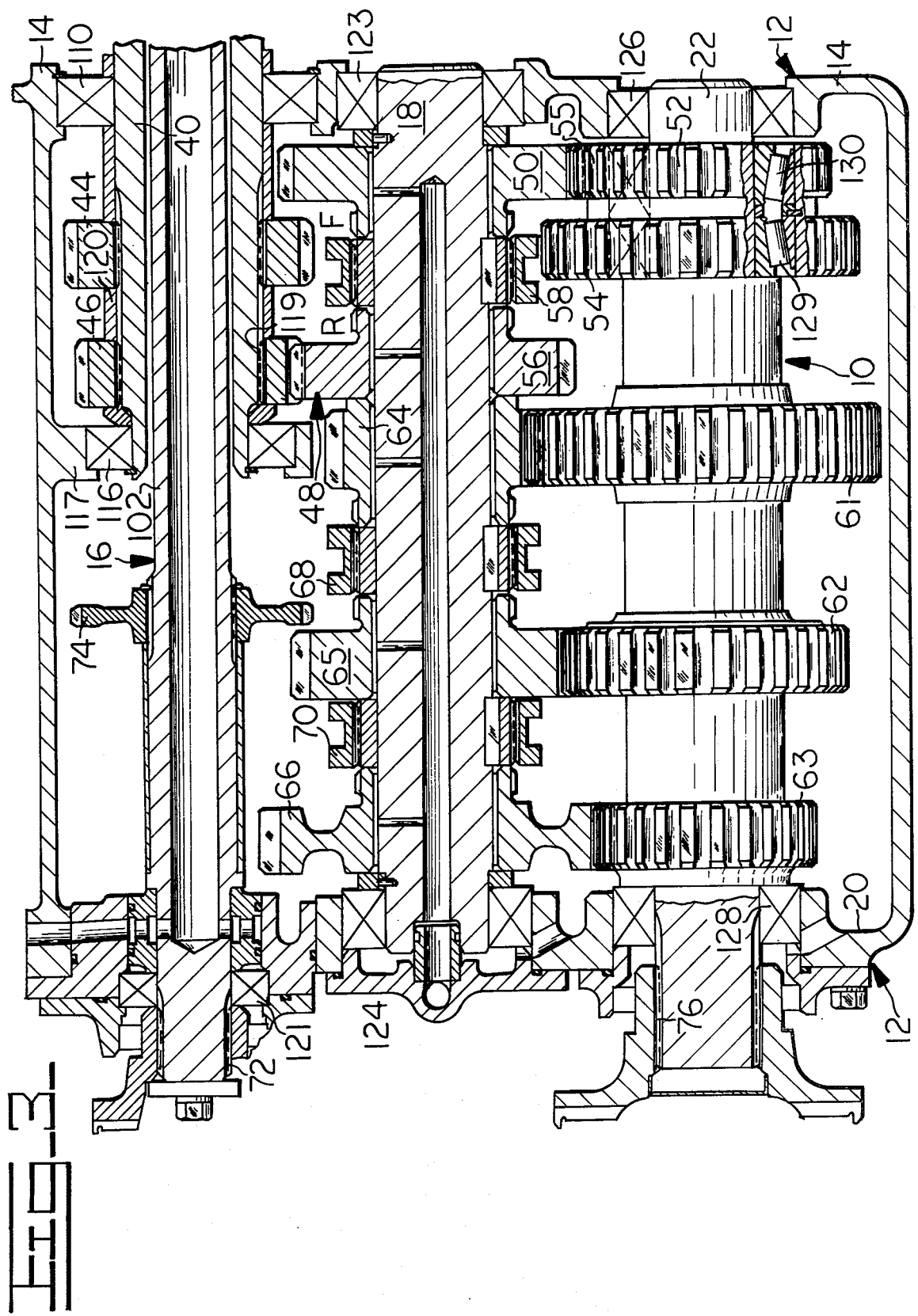

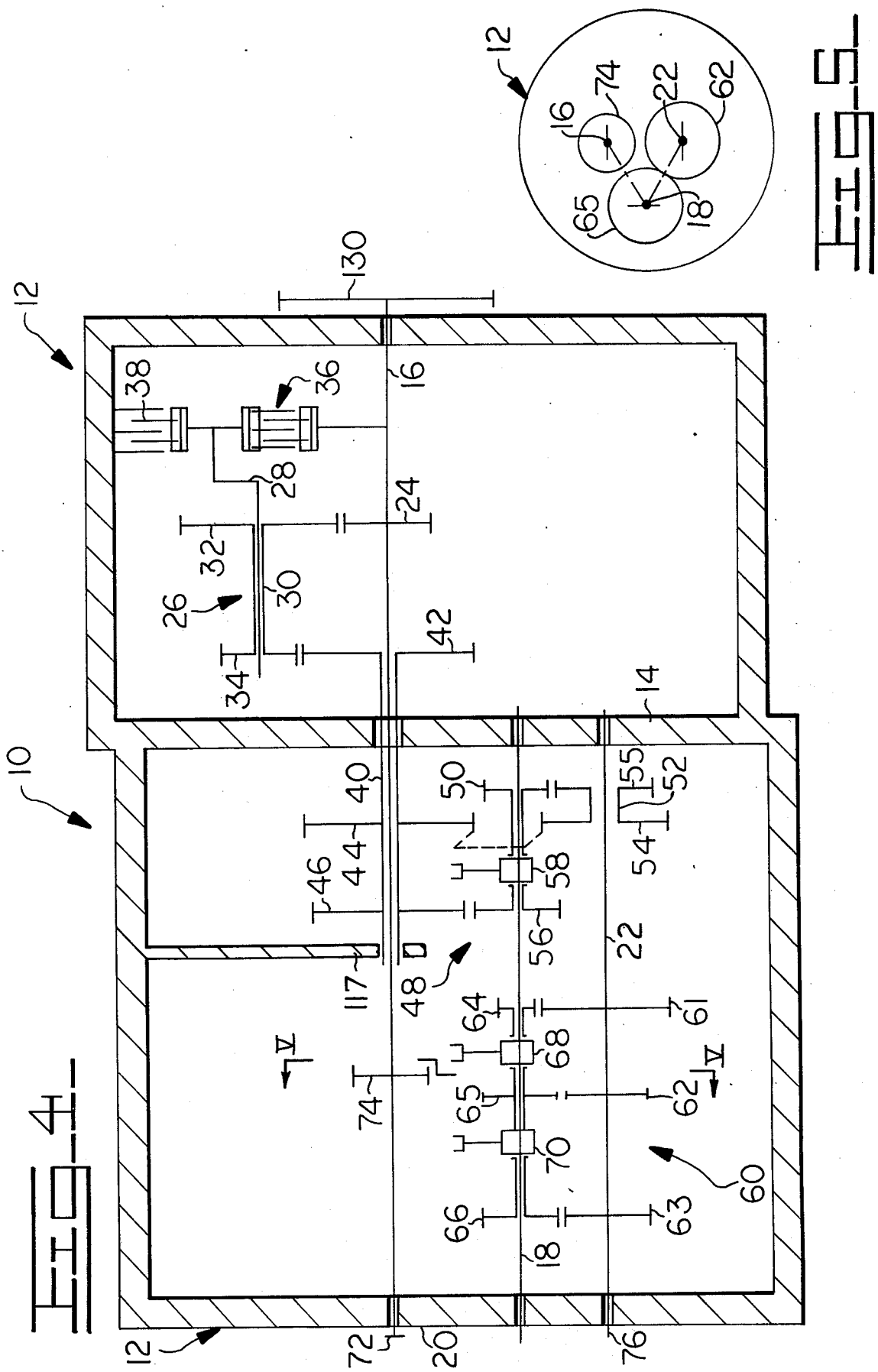

COMPACT TRANSMISSION HAVING A POWER TAKEOFF SHAFT AND HYDRAULICALLY ACTUATED CLUTCHES

BACKGROUND OF THE INVENTION

The present invention relates to a direct drive transmission for heavy equipment and more particularly relates to a multi speed transmission with a two speed underway shift capability coupled with a plurality of speed gears and directional gears to provide an equal number of forward and reverse speeds.

The transmission of power from a vehicle engine to the ground engaging devices of a vehicle such as wheels or tracks, requires some sort of a speed reduction device interposed between the engine and the vehicle wheels, particularly for use during high power requirements and low operating speeds of the vehicle. Such a speed reduction device, commonly called a transmission, generally is peculiar to the type and configuration of a vehicle to which it is associated. In construction equipment, wherein the vehicle may operate at a relatively constant speed for prolonged periods of time or may operate at or below a particular speed, the requirement found in most vehicle transmissions for a multispeed underway capability to provide a wide range of vehicle speeds is considerably diluted. Therefore, a transmission wherein a limited shift capability is available underway with additional shift capability available through direct engagemet of a speed change transmission while the vehicle is stopped is appropriate to such construction equipment.

SUMMARY OF THE INVENTION

Accordingly, the present invention provides a transmission which allows for an underway shift capability while providing additional ranges in a direct drive engagement speed section. Specifically, the primary object of the invention is to provide a direct drive transmission having a range section providing an underway shift capability coupled with a directly engageable speed section.

Another object of this invention is to provide a direct drive transmission wherein the underway shifting in the range section is accomplished in a single planetary unit.

Still another object of this invention is to provide a direct drive transmission which, while fulfilling the above objects, includes a directional drive section coupling the planetary underway shift section and the directly engageable speed section.

Still another object of the invention is to provide a direct drive transmission which accomplishes the above objects and includes a power take off shaft directly connected with the input shaft.

Still another object of the invention is to provide a direct drive transmission wherein the output shaft is utilized as an idler gear shaft in the directional drive section.

Briefly stated, the invention is a vehicle transmission having a housing and an input shaft journalled in the housing. A first sun gear is drivingly mounted on the input shaft and in turn drives a plurality of first planet gears carried on a planet carrier coaxially mounted about the input shaft. The transmission has an intermediate output shaft coaxially mounted about the input shaft and a second sun gear having a different number of drive teeth than the first sun gear and mounted on the intermediate output shaft. A plurality of second planet gears are integrally formed with the plurality of first planet gears and carried on the planet carrier, the second planet gears intermesh with the second sun gear. A first clutch means is provided to selectively connect the planet carrier with the input shaft to rotate the intermediate output shaft at a speed equal to the input shaft. A brake means is also provided to selectively stop rotation of the planet carrier relative the input shaft to allow the plurality of second planet gears to rotate the intermediate output shaft at a different speed than the input shaft. A countershaft is journalled in the housing in parallel relationship to the input shaft. A directional drive section is included and is driven by the intermediate shaft and includes drive reversal means for selectively rotating the countershaft in one or the other directions relative the direction of rotation of the input shaft. An output shaft is also journalled in the housing in parallel relationship to the countershaft and has associated therewith a plurality of speed reducing drive means selectively engageable with the countershaft for rotating the output shaft at differing speeds relative the countershaft.

These and other objects of the invention will become apparent from a study of the following specification and the accompanying drawings.

BRIEF DESCRIPTION OF THE DRAWINGS

FIG. 1 illustrates the relationship between FIGS. 2 and 3.

FIG. 2 is a sectional view of the planetary reduction section of the transmission disclosed herein.

FIG. 3 is a sectional view of the remaining portions of the transmission shown in FIG. 1 particularly showing the directional drive section and the multi range speed section.

FIG. 4 is a schematic layout of the transmission shown structurally in FIGS. 2 and 3.

FIG. 5 is a view taken at line V—V in FIG. 4 to show the relationship of the shafts in the transmission described herein.

DESCRIPTION OF THE PREFERRED EMBODIMENT

Referring to FIGS. 2 and 3, a vehicle transmission 10 is shown in its entirety. Transmission 10 includes a housing 12, portions of which are shown in FIGS. 2 and 3. The housing is generally divided into two sections by an intervening wall 14 shown both in FIGS. 2 and 3. By dividing housing 12 into two sections by wall 14, various shafting elements may be foreshortened, thus saving weight, space and production costs. Particularly, transmission housing 12 is transpired by input shaft means 16 journalled at either end in the transmission housing and also at wall 14. In addition to input shaft means 16, the transmission includes a countershaft 18 hournalled between wall 14 and an end wall 20 (see also FIG. 4). In addition to countershaft 18, an output shaft 22 is also journalled between wall 14 and end wall 20 and lies generally in a parallel relationship to countershaft 18 which itself is parallel to input shaft means 16.

Referring to FIG. 4, the schematic layout of the transmission, it can be seen that input shaft means 16 may be drivingly interconnected with countershaft 18 which in turn is engageable with output shaft 22. Specifically, the input shaft means has drivingly associated therewith a sun ger 24. Rotatably mounted about the input shaft means is a planetary gear arrangement 26 having a planet carrier 28 on which are mounted a plurality of planet clusters 30 each comprised of a first planet gear 32 and a second planet gear 34, the two planet gears unitarily formed together. First planet gear 32 is in intermeshing relationship with sun gear 24. The planet carrier 28 is engageable with the input shaft means by a rotating clutch 36. Engagement of rotating clutch 36 rotates the planet carrier at the same speed as the input shaft means. In addition to rotating clutch 36, a brake means such as brake 38 is provided to stop rotation of the planet carrier by locking the planet carrier with housing 12. It will become apparent in the subsequent discussion that rotating clutch 36 and brake 38 provide an underway shift capability in this transmission.

Coaxially mounted about input shaft means 16 and journalled in wall 14 is a quill shaft 40. Quill shaft 40 has drivingly mounted at the end adjacent planetary gear arrangement 26 a second sun gear 42 drivingly engaging the plurality of second planet gears 34 of planet clusters 30. On the opposite side of wall 14, the quill shaft has drivingly mounted thereon two pinion gears forward pinion gear 44 and reverse pinion gear 46. The quill shaft is free to rotate about the input shaft means. Thus, actuation of brake 38 stops rotation of planet carrier 28 about the input shaft means and causes sun gear 24 to rotate planet cluster 30. Because of the sizing and configuration of first and second planet gears 32 and 34, second planet gear 34 drives second sun gear 42 at a different speed than the input shaft means. On the other hand disengagement of brake 38 and engagement of rotating clutch 36 causes the planet carrier to rotate at the same speed as the input shaft means and in turn to rotate quill shaft 40 at the same speed as the input shaft means. Thus, it can be seen that the sizing and dimensions of planet cluster 30 determine the underway shift characteristics of this transmission.

Pinion gear 44 and pinion gear 46 mounted on quill shaft 40 are engageable with the output shaft 22 through the countershaft 18, specifically through a directional drive section 48. Directional drive section 48 is comprised of the aforesaid pinion gears 44 and 46, rotatable gears mounted on countershaft 18 each engageable therewith by drive engagement means and an idler type cluster gear rotatingly mounted on output shaft 22. In order to rotate countershaft 18 in a first direction, a forward driven gear 50 is rotatably mounted on countershaft 18. Associated with the forward driven gear 50 is a cluster gear 52 rotatably mounted on output shaft 22. Cluster gear 52 is comprised of a first gear 54 and a second gear 55 integrally formed one with the other. First gear 54 is in an intermeshing relationship with pinion gear 44 while second gear 55 is in intermeshing relationship with the forward driven gear, thus rotation of pinion 44 results in rotation of forward driven gear 50 in the same direction. It should be noted in FIGS. 3 and 4 wherein the directional drive section is illustrated, the shaft members have been spaced apart in a single plane, the angular relationship in the particular embodiment shown in FIGS. 2 and 3 between input shaft means 16, output shaft 22, and countershaft 18 is shown in FIG. 5. A second gear or reverse driven gear 56 is also rotatingly mounted on the countershaft and is intermeshing relationship with pinion gear 46. Appropriate drive engagement means, in this case a sliding collar 58, is slidably associated with countershaft 18, whereby movement of collar 58 in one direction engages the forward driven gear with countershaft 18 while movement of collar 58 in the other opposite direction engages reverse driven gear with the countershaft. The countershaft is thus rotated in a first direction or a forward direction while forward driven gear 50 is engaged therewith by collar 58 and in a reverse direction while reverse driven gear 56 is engaged therewith by collar 58. The collar 58 may be positionable in a third neutral position midway between the forward and reverse driven gear to disconnect countershaft 18 and the output drive train from the input section.

Countershaft 18 has a plurality of speed reducing drive engagement means selectively engageable with countershaft 18 for driving output shaft 22 at differing speeds relative input shaft means 16. In particular, the plurality of speed reducing drive engagement means constitutes a speed reduction section 60. In the embodiment illustrated, this plurality of speed reducing drive engagemet means includes three driven gears, a first driven gear 61, a second driven gear 62, and a third driven gear 63, each fixedly mounted on output shaft 22. Rotatably mounted on and engageable with the countershaft, are three driving gears 64, 65, and 66 respectively intermeshing with the driven gears 61, 62, and 63. In order to engage the driving gears with countershaft 18 and thereby complete a drive train from the input shaft means to output shaft 22, the transmission is provided with a low range drive engagement means such as a sliding collar clutch 68 slidable on countershaft 18, and a high range drive engagement means such as sliding collar clutch 70 also slidable on countershaft 18. Movement of sliding collar 68 in a first direction will engage driving gear 64 with countershaft 18 thus rotating output shaft 22 through driven gear 61. Movement of sliding collar 68 in the other opposite direction will engage driving gear 65 with countershaft 18 to drive driven gear 62 and thus output shaft 22. Movement of sliding collar 70 engages driving gear 66 with countershaft 18 to drive the output shaft by rotating driven gear 63. The sizing and the configuration of the various gear pairs provides the desired output drive ratio.

In addition to the aforedescribed drive reduction ratios, transmission 10 is provided with a power take off capability at spline connection 72 exterior of end wall 20. Spline connection 72 is associated with input shaft means 16 distal of planetary gear arrangement 26. Additionally, input shaft means 16 may be provided with an accessory drive gear 74 to drive any one of a number of accessories such as an internal oil system for the transmission. Finally output shaft 22 which, as noted above, is journalled in wall 4 and end wall 20, extends outwardly of end wall 20 and has integrally formed therewith a spline type connection to interconnect with a vehicle drive shaft.

Having generally described the fundamentals of the transmission with reference to the schematic diagram shown in FIG. 4, reference is made to FIGS. 2 and 3 for specific details found in a specific embodiment of this transmission. Referring particularly to FIG. 2, input shaft means 16 is comprised of a hollow shaft 78. Splined to hollow shaft 78 are elements of rotating clutch 36. Specifically, a first member 79 which defines an annular cylinder 80. Disposed in the annular cylinder is an annular piston 82. A second member 84 is also splined to hollow shaft 78. Second member 84 carries a plurality of outwardly extending annular discs 86, of conventional type found in interleaved disc type clutches, slidably affixed to the perimeter of the second member. Additionally, the second member has radially extending outwardly therefrom and affixed thereto a reaction member 88 so that annular discs 86 are disposed between piston 82 and reaction member 88.

As previously stated, planet carrier 28 is rotatably mounted about input shaft means 16. Splined to and extending axially from planet carrier 28 is a combination clutch and brake disc mounting member 90. The combination clutch and brake disc mounting member 90 is cylindrical in form and has a pluraity of rotating clutch discs 92 slidably affixed to and extending inwardly of the interior surface to interleave with the outwardly extending annular clutch discs 86 associated with second member 84. Application of fluid pressure to annular cylinder 80 will move annular piston 82 leftwardly as shown in FIG. 2 thus bringing the annular clutch discs 86 into driving engagement with the clutch discs 92 between piston 82 and reaction member 88 to rotate combination cylindrical clutch and brake disc carrier 90 and planet carrier 28 at a speed equal to that of the input shaft.

Slidably affixed by spline means to the outer surface and extending outwardly therefrom of combination cylindrical clutch and brake disc carrier 90 are a plurality of rotating brake discs 94 interleaved with a similar plurality of fixed brake discs slidably associated by bolt means 97 with housing 13. A brake piston 98 is also associated with housing 13 and forms therewith an annular cylinder 99. Brake piston 98 is movable upon the application of fluid pressure to cylinder 99 to force the rotating brake discs 94 into engagement with the fixed brake discs 96, between a reaction member 100 associated with housing 13 and piston 98. Movement of the brake piston rightwardly as shown in FIG. 2 will, as noted above, bring the rotating brake discs in engagement with the fixed brake discs to cause the cylindrical clutch and brake disc carrier to cease rotation; thus, the plurality of planet clusters 30 are rotated by means of sun gear 24. Sun gear 24 may be integrally formed with hollow shaft 78 as shown in FIG. 1.

Housing 13 is constructed with appropriate hydraulic passages to allow application of the rotating clutch 36 and brake 38 just described. Particularly housing 13 defines a passage 112 which communicates with annular cylinder 80 for application of pressure to annular piston 82. A second passage 114 also defined in housing 13 communicates with annular cylinder 99 associated with the brake 38 for application of pressure to brake piston 98.

Input shaft means 16 is further comprised of a power take off shaft 102 extending from the vicinity of sun gear 24 to end wall 20 and outwardly therefrom. Power take off shaft 102 is splined to hollow shaft 78 by spline connection 104 internally of sun gear 24. Quill shaft 40, which is coaxially mounted about input shaft means 16 is separated from hollow shaft 78 by appropriate bearing means 106 and is rotatable about power take off shaft 104 through additional bearing means 108. Quill shaft 40 is journalled in wall 14 by bearing means 110. Referring now to FIG. 3, quill shaft 40 is supported at its opposite end by bearing means 116 mounted in half wall 117. Pinion gears 44 and 46 are splined to quill shaft 40 by a common splined joint 119 and are spatially separated by an annular separator 120.

Power take off shaft 102 extends outwardly through end wall 20 and is supported at wall 20 by bearing means such as bearing 121. The spline connection 72 associated with input shaft means 16 may be formed with power take off shaft 102 as illustrated in FIG. 3.

Countershaft 18 which, as noted above, extends between wall 14 and end wall 20 is journalled at wall 14 by a bearing means such as bearing 123 and at end wall 20 by a bearing means such as bearing 124. Directional drive section 48 determines the direction of rotation of countershaft 18 and in the particular embodiment herein illustrated utilizes a unique method of providing an idler gear mounting. The idler gear which is comprised of cluster gear 52 is mounted about output shaft 22 and will be described further in the description of output shaft 22. The mounting of the remaining gears on countershaft 18 is conventional as are the drive engagement means utilized to drivingly engage these gears with countershaft 18 thus providing a drive train through the transmission.

Output shaft 22 is similarly journalled in wall 14 by a bearing 126 and supported in end wall 20 by a bearing 128. Cluster gear 52, which was previously described as rotatably mounted about output shaft 22, is mounted on paired tapered bearings 129 and 130. The remaining driven gears on output shaft 22 are fixedly mounted thereon and separated by separation means well known in the art.

Operation of transmission 10 should be apparent from the above description of the structure; however, a brief review of the general features of the embodiment illustrated is appropriate. Input shaft means 16 is rotated by a prime mover or an engine (not shown). In the embodiment illustrated, the input is provided through a coupling 131 splined to hollow shaft 78 which in turn rotates first member 79 and second member 84, second member 84 rotating the annular clutch discs 86. Concurrently, sun gear 24 is rotating planet cluster 30. Before engagement of either clutch 36 or brake 38, the vehicle operator selects a direction in the directional drive section 48 by movement of sliding collar 58 in one or the other direction. Additionally, the operator must select a direct drive speed reduction ratio in the speed reduction section by engagement of one of the plurality of driving gears 64, 65, or 66 by means of collar 68 or collar 70. Once a direction and speed reduction has been selected, the rotating clutch 36 or the brake 38 may be selected. Selection of the brake 38 provides a low range output through cluster 30. Engagement of brake 38 is accomplished by the application of fluid pressure supplied through passage 114 to cylinder 99 to urge piston 98 rightwardly as shown in FIG. 2 to bring the interleaved braking discs into engagement one with the other thus stopping combination cylindrical clutch and brake disc carrier 90. With brake 38 so engaged, hollow shaft 78 will rotate the planet clutster 30 to provide a reduction to the directional drive section through the first planet gear 32 which is of a greater diameter and thus carries more teeth than the second planet gear 34 in the embodiment illustrated. A high range or direct drive through the planetary section is also available by disengaging brake 38 and engaging rotating clutch 36. Engagement of rotating clutch 36 is accomplished by providing fluid pressure to passage 112 and cylinder 80 to urge piston 82 leftwardly as shown in FIG. 2 to bring the interleaved clutch discs 86 and 92 into engagement and thus rotate the clutch and brake disc carrier 90 at a speed equal to that of the input shaft means 16. With the clutch and brake disc carrier 90 rotating at a speed equal to the input shaft means, a direct connection is made between the input shaft means 16 and quill shaft 40. The operation of the remainder of the transmission is as described above, with selection of the speed gears and the directional gears possible only with the vehicle stopped with brake 38 and clutch 36 disengaged.

Although the preferred embodiment has been shown with three possible speed ranges in combination with the two underway ranges, it should be understood that additional speed ranges are readily adaptable to this transmission and well within the purview of the specification. Other modifications and adaptations within the skill of the art are also to be considered within the purview of the aforedescribed embodiment without departing from the scope of this invention.

What is claimed is:

1. A vehicle transmission comprising:

a housing including first, second and third generally parallel wall members;

input shaft means transpiercing generally normally and journalled in said first, second and third generally parallel wall members;

an output shaft journalled in said second wall member and journalled and transpiercing said third wall member, said output shaft disposed in a generally parallel relation to said input shaft;

a first sun gear drivingly associated with said input shaft means;

an intermediate output shaft coaxially mounted about said input shaft means and journalled in said second wall member;

a second sun gear drivingly mounted on said intermediate output shaft, said first and second sun gears disposed between said first and second generally parallel wall members;

a planet carrier coaxially mounted about said input shaft means;

a plurality of clustered planet gears each cluster rotatably mounted on said planet carrier and each cluster comprised of a first planet gear and a second planet gear integrally formed one with the other, said first planet gear intermeshing with and driven by said first sun gear, said second planet gear having a different number of drive teeth than said first planet gear and intermeshing with and driving said second sun gear;

first clutch means for selectively connecting said planet carrier with said input shaft means to rotate said intermediate output shaft at a speed equal to said input shaft means;

first brake means for selectively stopping rotation of said planet carrier relative said input shaft means to allow said plurality of second planet gears to rotate said intermediate output shaft at a different speed than said input shaft means;

a countershaft journalled in generally parallel relation to said input shaft means between said second and third wall members;

a directional drive section driven by said intermediate output shaft comprising a forward pinion gear drivingly mounted on said intermediate output shaft, a reverse pinion gear drivingly mounted on said intermediate output shaft, a forward driven gear rotatably mounted on said countershaft, a reverse driven gear rotatably mounted on said countershaft and in intermeshing relationship with said reverse pinion gear, a reversing cluster gear rotatably mounted on said output shaft including a first gear in intermeshing relationship with said forward pinion gear and a second gear integrally formed with said first gear and intermeshing with said forward driven gear, and directional drive engagement means associated with said countershaft and selectively movable in a first direction for drivingly engaging said forward driven gear with said countershaft and selectively movable in a second direction for drivingly engaging said reverse driven gear with said countershaft; and a plurality of speed-reducing drive means selectively engageable with said countershaft for rotating said output shaft at differing rotational speeds relative said countershaft, wherein the transmission housing further comprises a halfwall between the second and third walls, and further wherein the intermediate output shaft is journalled in said half wall.

2. The transmission as set forth in claim 1 wherein said first brake means comprises:

a plurality of annular fixed braking discs slidably associated with the transmission housing by spline means for preventing rotation thereof while allowing axial movement thereof relative said input shaft means;

a plurality of rotating braking discs interleaving with said fixed braking discs and associated with the planet carrier by spline means for rotatably fixing said braking discs with said planet carrier while allowing axial movement thereof;

a brake reaction member associated with said transmission housing; and brake piston means operably movable toward said brake reaction member by fluid pressure for bringing said rotating braking discs into engagement with said fixed braking discs.

3. The transmission as set forth in claim 2 wherein the first clutch means comprises:

a plurality of interleaved annular clutch discs, wherein one disc is slidably associated and rotatable with the input shaft and the next adjacent disc is slidably associated and rotatable with the planet carrier;

clutch engagement means operable by fluid pressure and selectively controllable for bringing said interleaved clutch discs into engagement one with another so that said planet carrier rotates at a speed equal to said input shaft.

4. The transmission as set forth in claim 3 wherein the plurality of speed reducing drive means comprises:

a low speed drive gear rotatably mounted on the countershaft;

a low speed driven gear drivingly mounted on the output shaft and in intermeshing relation with said low speed drive gear;

an intermediate drive gear rotatably mounted on the countershaft;

an intermediate driven gear drivingly mounted on the output shaft and in intermeshing relation with said intermediate speed drive gear;

a high speed drive gear rotatably mounted on the countershaft;

a high speed driven gear drivingly mounted on the output shaft and in intermeshing relation with said high speed drive gear;

first drive engagement means associated with said countershaft and movable in a first direction for drivingly engaging said low speed drive gear with said countershaft and movable in a second direction for drivingly engaging said intermediate speed drive gear with said countershaft;

second drive engagement means associated with said countershaft and movable relative said countershaft for drivingly engaging said high speed drive gear with said countershaft.

5. The transmission as set forth in claim 4 wherein the input shaft means extends outwardly of the third generally parallel wall member and wherein the transmission further comprises a power take-off coupling drivingly mounted on said input shaft means exterior of said third generally parallel wall member.

6. The transmission as set forth in claim 5 further comprising an accessory drive gear means drivingly associated with said input shaft means interior of said housing for driving transmission accessories.

7. The transmission as set forth in claim 3 further comprising a cylindrical member axially extending from the planet carrier, the interleaved clutch discs associated with said planet carrier extending inwardly from said cylinder and the interleaved brake discs associated with said planet carrier extending outwardly of said cylinder, so that the brake means circumferentially surrounds the clutch means.

8. The transmission as set forth in claim 7 wherein the transmission housing is divided transversely by a wall member, and further wherein said input shaft means is journalled through said wall member; and further wherein said countershaft is journalled between said wall member and the exterior of said housing and said output shaft is journalled between said wall member and the exterior of said housing.

* * * * *